J. A. HART.
BRAKE.
APPLICATION FILED MAY 24, 1910.
997,290.
Patented July 11, 1911.
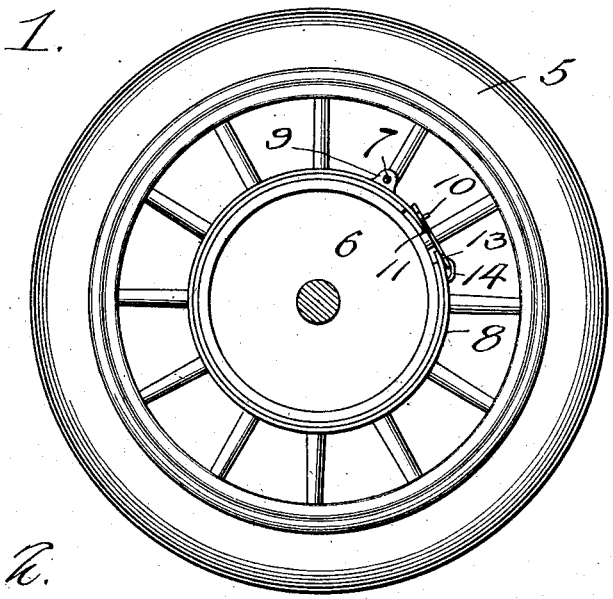
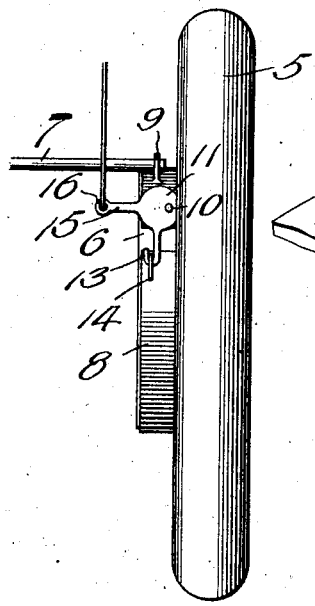
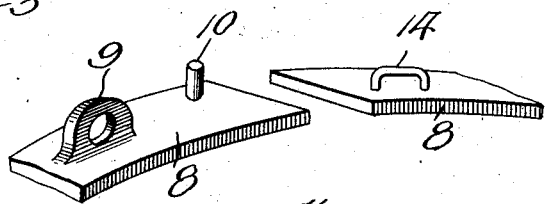
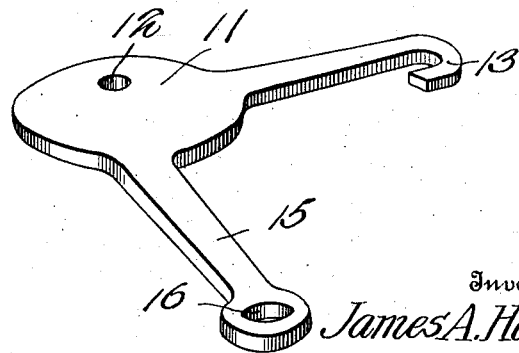
Witnesses
Hugh H. Ott
John A. Donegan
Inventor
James A. Hart
By Victor J. Evans
Attorney

UNITED STATES PATENT OFFICE.

JAMES A. HART, OF TRENTON, NEW JERSEY.

BRAKE.

997,290.  Specification of Letters Patent.  Patented July 11, 1911.

Application filed May 24, 1910. Serial No. 563,117.

*To all whom it may concern:*

Be it known that I, JAMES A. HART, a citizen of the United States, residing at Trenton, in the county of Mercer and State of New Jersey, have invented new and useful Improvements in Brakes, of which the following is a specification.

This invention relates to improvements in band brakes and is particularly designed for use with motor vehicles, electric cars and the like.

One object of the invention is the provision of an improved means for forcing the surface of the friction band into engagement with the drum.

Another object is the provision of an improved form of friction band and means for suspending the same.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings, forming part of the specification;—Figure 1 is a side elevation of a wheel showing my improved device applied thereto. Fig. 2 is an end view showing a portion of the support for the friction band. Fig. 3 is a detail perspective of the opposite end portions of the friction band. Fig. 4 is a similar view of the means for contracting the friction band.

Similar numerals of reference are employed to designate corresponding parts throughout.

The wheel is designated by the numeral 5 and integrally or otherwise secured to the inner surface of the wheel is a circular drum 6, the drum 6 being considerably less in diameter than the diameter of the wheel and disposed concentric with the latter.

Extending transverse the frame of the car or vehicle to which the device is applied is a supporting bar 7, this supporting bar extending to a point approximately at the middle of the upper rear segment of the wheel. The supporting bar 7 may be secured in any preferred manner, and while I have shown but one end extending to a point adjacent the wheel shown, it must be understood when a brake is employed for each wheel of the car or vehicle the total number of supporting bars will correspond to the number of wheel axles, the opposite ends of said supporting bars extending to points adjacent the inner surfaces of the wheels as before described.

The friction band is designated by the numeral 8 and as usual is split and expanded to a diameter a trifle greater than the diameter of the drum 6, thus permitting the friction band to embrace the drum and to normally slightly bear on the periphery of said drum.

By reference now to the drawings it will be seen that the friction band, adjacent to one end is provided on its outer surface with a radially perforated lug 9, which receives one end of the bar 7, and formed on the outer face of the band and between the lug 9 and the adjacent end of the band is a radially extending shaft or stud 10.

The means for contracting the friction band is shown to include a circular disk 11, of suitable diameter having an eccentric opening 12 to receive the stud or shaft 10, the said stud or shaft 10 being considerably greater in length than the thickness of the disk and any suitable means may be employed with that portion of the stud or shaft extending beyond the disk to secure the said disk against displacement, and to permit turning movement of said disk.

Extending radially from one face of the disk is a hook 13, the hook 13 extending to a point over the opposite end of the band and engages with a U-shaped keeper 14 formed on that end of the band opposite to the end on which the stud or shaft 10 is formed, as clearly shown in the drawings. Extending radially from the disk and at a point adjacent to the hook 13 is an arm 15, the free end of which is provided with an eye 16 which receives the end of a connecting rod (not shown) operable by the foot lever or operating rod (not shown). With this construction it will be manifest, owing to the eccentric mounting of the disk, that when the arm 15 is turned in one direction the hook 13 will move that end of the band to which it is attached, toward the opposite end of the band, whereupon the band will be contracted and bind on the drum 6, thus effecting an application of the brakes.

It will be obvious when the device just described is applied to all the wheels of a car or vehicle that the arms 15 may, by suitable mechanism be connected to move simultaneously, thus effecting a simultaneous application of the brakes to all the wheels.

From the foregoing it is evident that I have provided a device which is comparatively simple in structure and inexpensive in manufacture, embodying few parts and these so arranged that the danger of derangement will be reduced to a minimum.

I claim:—

In a brake, the combination with a support and a brake drum; of a split band embracing the drum and secured at one end portion to the support, a stud located on the secured end portion of the band and extending radially with respect to the drum, a disk having an eccentric opening to freely receive the stud and provided with radial arms, one of said arms having its free end portion adapted to loosely engage that end portion of the band opposite the one to which the disk is connected, and means connected with the opposite arm serving to rock the latter, for the purpose described.

In testimony whereof I affix my signature in presence of two witnesses.

JAMES A. HART.

Witnesses:
JOHN H. KAFER,
LEO EISNER.

Copies of this patent may be obtained for five cents each, by addressing the "Commissioner of Patents, Washington, D. C."